R. d'Heureuse.
Adjusting Picture Cords.
N° 88,373. Patented Mar. 30, 1869.
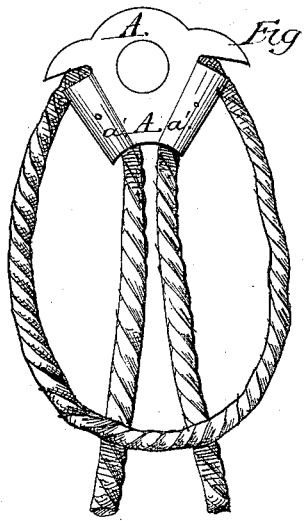
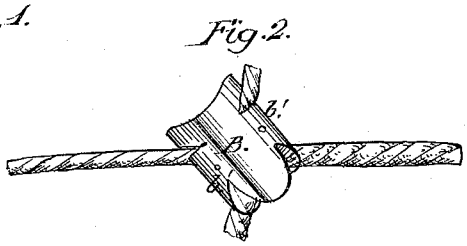
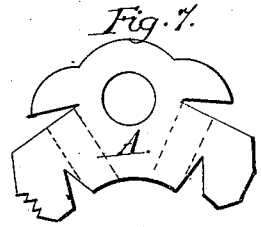
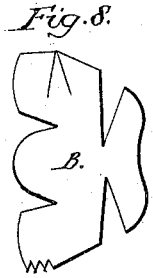
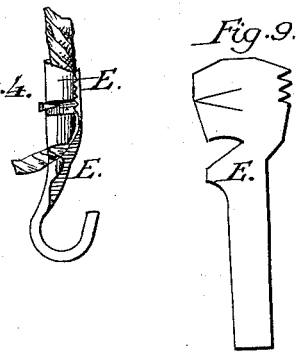
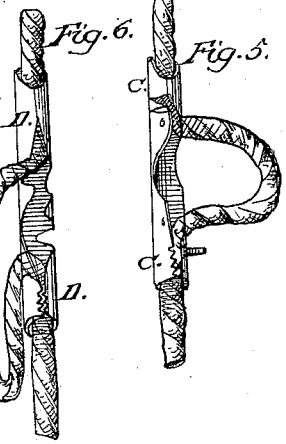
Witnesses:
Inventor:
R. d'Heureuse.

R. D'HEUREUSE, OF NEW YORK, N. Y.

Letters Patent No. 88,373, dated March 30, 1869.

---

IMPROVED ATTACHMENT FOR ADJUSTING CORDS FOR PICTURES, &c.

---

The Schedule referred to in these Letters Patent and making part of the same.

---

*To all whom it may concern:*

Be it known that I, R. D'HEUREUSE, of New York city, in the county and State of New York, have invented a new and improved Attachment for Adjusting Cords for Hanging Pictures, &c.; and I do hereby declare that the following is a full, clear, and exact description thereof, which will enable others skilled in the art to make and use the same, reference being had to the accompanying drawings, forming part of this specification, in which—

Figures 1, 2, 3, 4, 5, and 6, represent different forms of my improved cord-attachment.

Figures 7, 8, 9, and 10, represent the same cut out but not formed.

Similar letters of reference indicate corresponding parts.

My invention has for its object to furnish an improved attachment for cords for hanging pictures, glasses, and other purposes, by means of which the cords may be easily and quickly taken up and let out for adjusting the hanging of the suspended object, without forming knots in the cords, or untying knots previously formed; and It consists in the tube or tubes formed with longitudinal or transverse notches, or slots, whether used with or without pins, hooks, or teeth, as hereinafter more fully described A represents one form of my improved attachment, which is cut out of sheet-metal, in the shape shown in fig. 7.

The wings are then bent up, into the shape shown in fig. 1, to form tubes $a'$, to receive the cord, the notches in the sides of the upper part forming transverse notches at the ends of the said tubes, and the notches in the lower part forming longitudinal notches in the sides of said tubes, so that the cord may be secured in place, when adjusted, by drawing it into one the other of these notches.

The attachment A is represented as having a hole formed in it, to receive the nail or hook from which the cord is to be suspended, and as having the tubes $a'$ formed at an angle with each other.

B, figs. 2, 3, and 8, represents another form of the attachment, similar to the one, A, except that the tubes $b'$ are parallel to each other, and it is without the hole to receive the hook or nail.

In fig. 5, the attachment C is made in the form of a single tube, with longitudinal notches to receive and fasten the cord.

D, fig. 6, is the same as C, fig. 5, except that it is formed with both longitudinal and transverse notches to receive and fasten the cord.

In fig. 4, the attachment E is formed with a hook upon its lower end, to hook into the eye of the screw attached to the frame to be suspended.

When properly adjusted, the attachment may be permanently secured to the cord by having teeth formed in the edge or edges that are turned over to form the tubes, which, by compressing, said tubes may be forced into the cord. Or small hooks may be cut out of the plate that is turned over to form the tubes, as shown in figs. 4 and 5, which said hooks may be forced into the cord, to permanently secure it in place. Or holes may be formed through the tubes, as shown in figs. 1, 2, 3, and 5, to receive a pin, which passes through the cord.

If desired, this attachment may be cast, or constructed in any other manner.

Having thus described my invention,

What I claim as new, and desire to secure by Letters Patent, is—

An adjusting-attachment for cords, made with one or two tubes, and provided with longitudinal and transverse notches, or slots, either or both, and whether used with or without teeth, hooks, or pins, substantially as herein shown and described, and for the purpose set forth.

The above specification of my invention, signed by me, this 24th day of February, 1869.

R. D'HEUREUSE.

Witnesses:
FRANK BLOCKLEY,
JAMES T. GRAHAM.